United States Patent [19]

Saxton

[11] Patent Number: 4,672,549
[45] Date of Patent: Jun. 9, 1987

[54] COIL SPRING FORMING MACHINE

[76] Inventor: Richard E. Saxton, 3270 Fairhill Dr., Rocky River, Ohio 44116

[21] Appl. No.: 667,288

[22] Filed: Nov. 1, 1984

[51] Int. Cl.[4] .......................... B21F 3/00; G06F 15/46; G06G 7/64
[52] U.S. Cl. .......................................... 364/468; 72/7; 72/138
[58] Field of Search ...................... 364/468, 472, 469; 72/7, 137, 138

[56] References Cited

U.S. PATENT DOCUMENTS

| | | | |
|---|---|---|---|
| 3,000,427 | 9/1961 | Gogan | 72/138 |
| 3,470,721 | 1/1967 | Scheublein, Jr. | 72/144 |
| 3,610,006 | 10/1971 | Scheublein, Jr. | 72/22 |
| 3,766,764 | 10/1973 | Ross et al. | 72/7 |
| 4,112,721 | 9/1978 | Takase et al. | 72/138 |
| 4,133,035 | 1/1979 | Grohowski et al. | 364/472 |
| 4,161,110 | 7/1979 | Ritter et al. | 72/7 |
| 4,289,004 | 9/1981 | Itaya | 72/138 |
| 4,424,569 | 1/1984 | Imazeki et al. | 364/474 |
| 4,444,036 | 4/1984 | Shibata et al. | 72/138 |

Primary Examiner—Jerry Smith
Assistant Examiner—Allen MacDonald
Attorney, Agent, or Firm—Fay, Sharpe, Fagan, Minnich & McKee

[57] ABSTRACT

A coil spring forming machine control system. The system controlling the coil parameters of length, pitch, and diameter.

16 Claims, 8 Drawing Figures

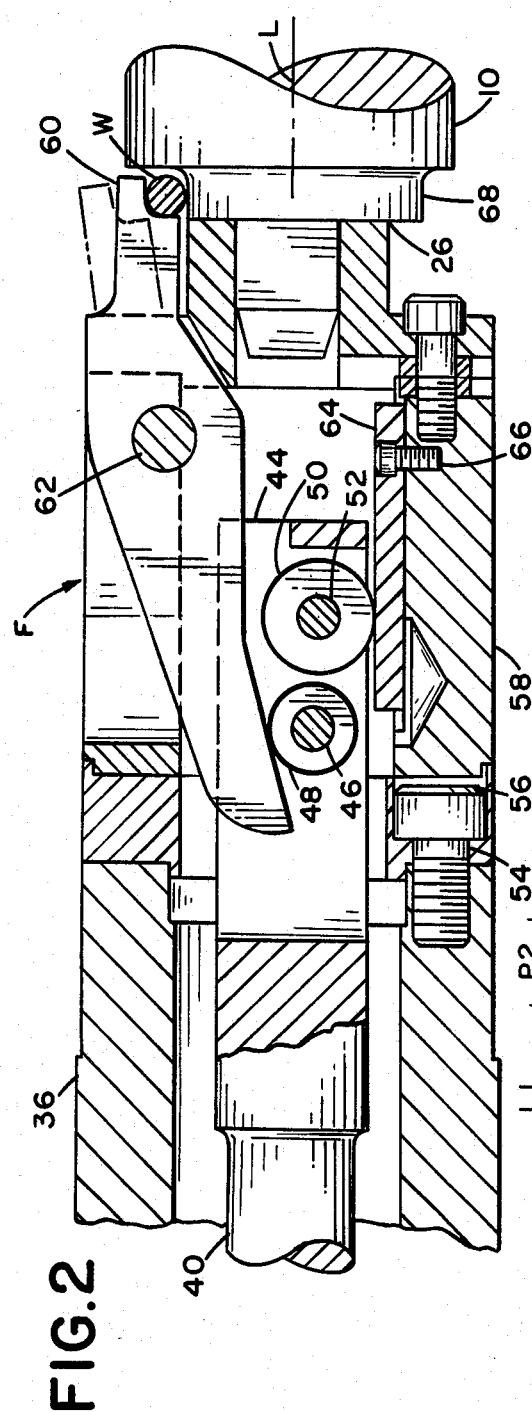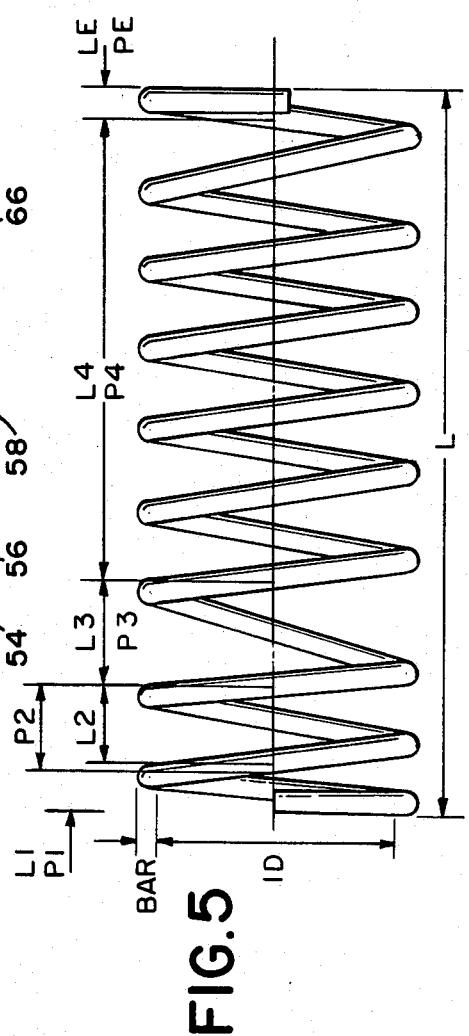

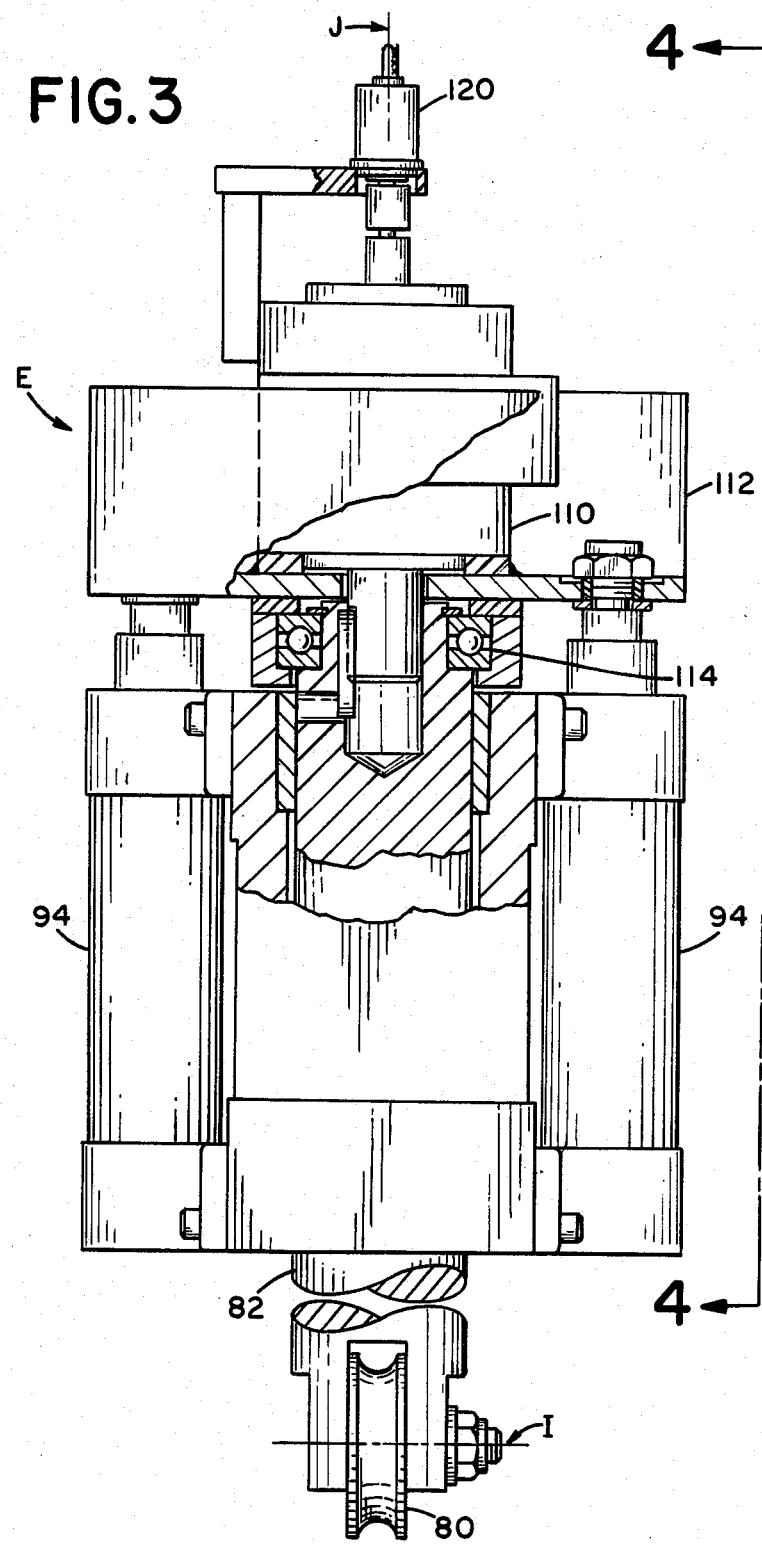

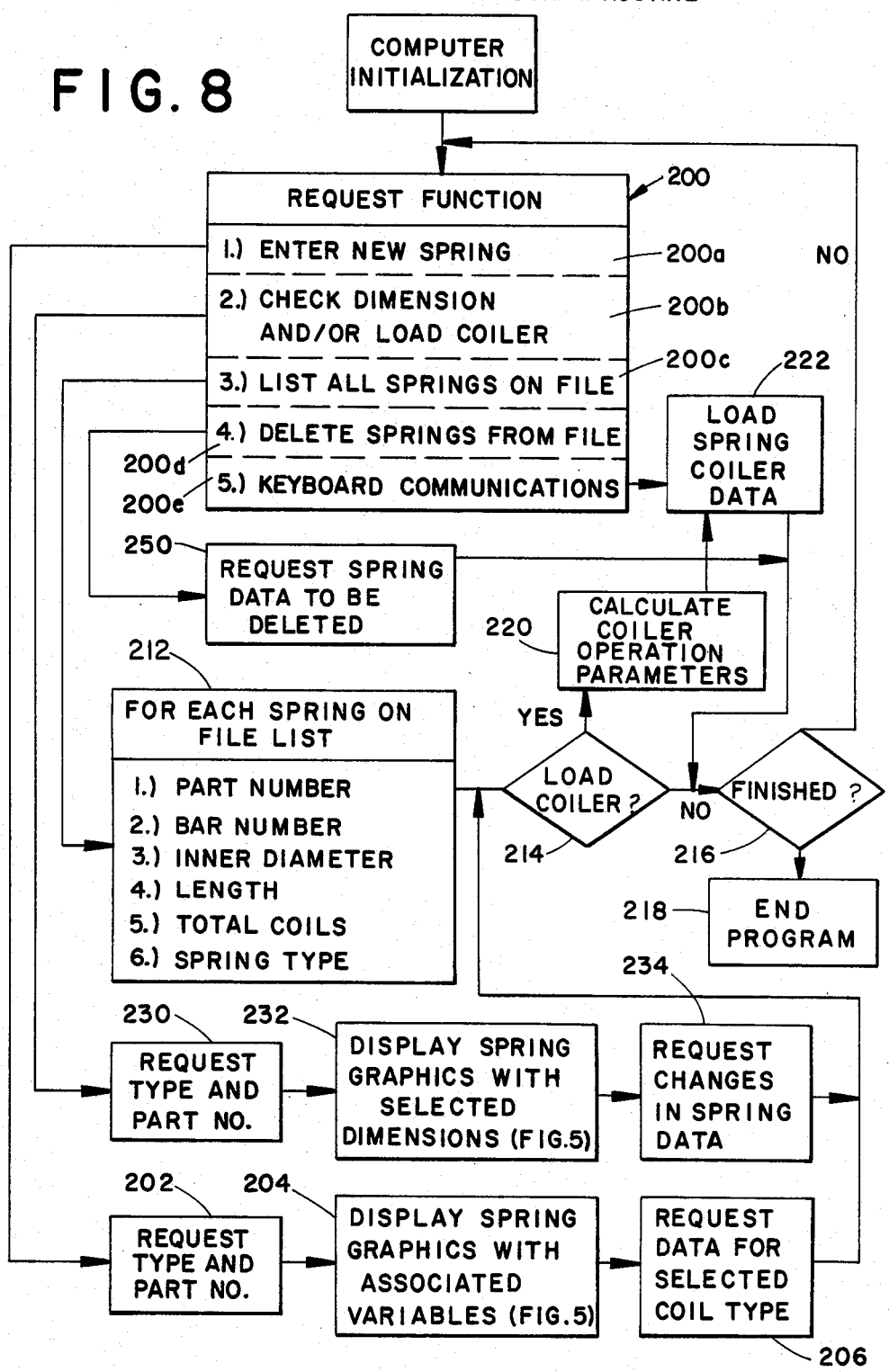
FIG. 8 PARAMETER PROCESSOR PROGRAM ROUTINE

COIL SPRING FORMING MACHINE

BACKGROUND OF THE INVENTION

The present invention relates to the arts of spring coiling and computer numerical control. The present invention finds particular application in computer control of spring coiling operations and is described with particular reference thereto. It is to be appreciated, however, the various aspects of the invention will find application in other coiling apparatus or electronic machine controls.

Present demand for heavy duty springs encompasses a wide variety of spring formats. Broadly speaking, springs can be of constant or variable pitch, or of constant or variable diameter. Depending on the final characteristics of a spring, the spring will behave in markedly different ways when placed into use. Some of the variations in the spring properties are changes in the spring force in varying proportion to the compression applied thereto, or variations in the natural resonant frequency of the spring. The multitude of applications for springs dictates a corresponding wide variety of diameters, thicknesses and pitches.

One machine which has found success in the coil spring forming was the "Gogan Coiler", as described in U.S. Pat. No. 3,000,427 issued Sept. 17, 1961, to Joseph Gogan. In the Gogan Coiler, a pliable bar stock was coiled about a mandrel, guided by a lead screw consisting of a round bar with spiral grooves thereon. While the Gogan Coiler performed effectively, one deficiency was that each type of coil to be manufactured required a dedicated lead screw. In addition to necessitating a wide inventory of lead screws, the operator time associated with changing the lead screws and the machine downtime during a changeover detracted from the Gogan Coiler's efficiency.

One effort to improve upon the Gogan Coiler is described in U.S. Pat. No. 3,470,721, issued Oct. 7, 1969, to Scheublein, et al. Scheublein, et al. substituted a pair of fingers driven by a worm gear for the lead screw of the Gogan machine. The coiler disclosed in Scheublein, et al. attempted to meet the demand for variable pitch springs by providing an integral number of discrete pitch variations without a dedicated lead screw for each spring. While the Scheublein, et al. patent may have had some advantages over the Gogan Coiler, it also had some drawbacks. The friction between the fingers and the bar stock from which the coil was formed, coupled with the narrow length of actual guide afforded by the fingers, created problems in the disclosed device.

Another shortcoming of the Scheublein, et al. coiler was that while it may have formed springs with a plurality of pitches, the pitch variations were discrete, i.e. when a certain point in the spring formation was reached a new pitch instantaneously began. Oftentimes, desired coil properties could only be met with constantly varying pitch.

A demand exists for a wide variety of coil springs. It is commonly desired that the spacing of the coils, the pitch of the coils, and the diameter of the coils be varied within a single spring. Presently, springs in which the pitch of the springs vary continuously over the length of the spring are in demand.

The present invention overcomes the foregoing difficulties and others. It contemplates a spring manufacturing device equal to the task of easily, quickly, and less expensively creating virtually any spring necessitated or desired for a particular application.

SUMMARY OF THE INVENTION

In accordance with a first aspect of the invention, an improved coil forming apparatus is provided. A mandrel is connected with a rotating means to be rotated about a longitudinal axis. A circumferentially channelled roller, which is mounted for movement perpendicular and parallel to the longitudinal axis directs rod stock to the mandrel.

In accordance with a second aspect of the invention, a coil forming apparatus includes an electronic control circuit. A data storage unit stores data indicative of preselected coil parameters, such as pitch, length, and diameter. A coil forming means selectively varies at least one of the preselected coil parameters. As a coil is formed, a sensing means senses at least the preselected parameters and generates a signal indicative thereof. A data comparing means compares the stored data with the sensing means signal and varies the coil forming means such that the stored data and the sensing signal remain within a preselected conformity.

In accordance with another aspect of the present invention, a new chuck for securing rod stock to the mandrel is provided. The chuck allows for the formation of coils with open end, tangent tail ends; that is to say, coils with ends of radially increasing diameters. The chuck for forming coils with these characteristics is particularly designed to work with the above noted coil forming guide.

In accordance with yet another aspect of the present invention, a method of forming coils is provided. Data representing at least one preselected coil parameter is stored electronically. As a coil is formed, the corresponding preselected parameter of the coil is monitored and a signal indicative of the monitored parameter is generated. The electronically stored data and the monitor signal are compared. The coil forming is altered in accordance with the comparison to form a coil with the preselected parameter.

One advantage of the present invention is that parameters of coil springs are freely varied to meet preselected spring requirements. The coil dimensions can be altered during the actual manufacture of coil springs.

Another advantage of the present invention is that coils are formed with pitches that vary essentially continuously over the length of the coil.

It is still another advantage of the invention that a procedure for setting up coil dimensions is user-friendly to a machine operator who enters the data.

Still another advantage is that appropriate machine controls are electronically determined.

Yet a further advantage of the invention is that various desired coil dimensions are implemented by software controls with a minimum of hardware changes.

Still another advantage is that a coil forming machine is quickly and easily adapted to form any one of a wide variety of coil styles.

Further advantages of the present invention will become apparent to those of ordinary skill in the art upon reading and understanding the following detailed description of the preferred embodiment.

BRIEF DESCRIPTION OF THE DRAWINGS

The invention may take physical form in certain parts and arrangements of parts and in various steps and arrangements of steps. The drawings are only for purposes of illustrating a preferred embodiment and are not to be construed as limiting the invention.

FIG. 2 is a sectional view of a chuck assembly in accordance with the present invention;

FIG. 3 is an elevational view in partial section of a guide roller adjustment assembly of FIG. 1;

FIG. 5 depicts a display of a spring and selectively variable parameters in accordance with the present invention;

DETAILED DESCRIPTION OF THE PREFERRED EMBODIMENT

Figure 1:
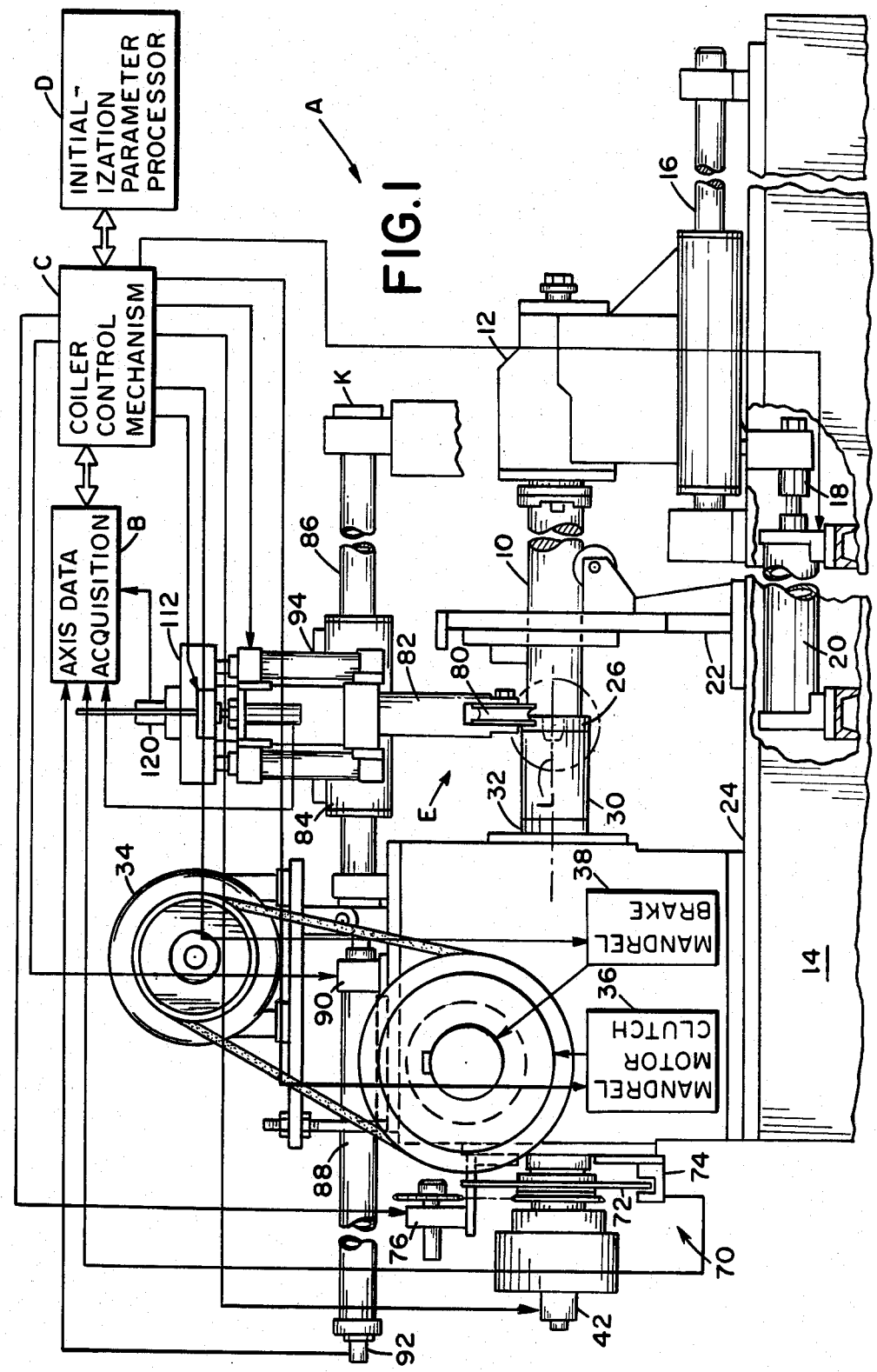
FIG. 1 is a digrammatic illustration of a coiling apparatus in accordance with the present invention.

With reference to FIG. 1, an electromechanical spring coiler A selectively coils bar stock type workpiece W into springs. A data acquisition means B monitors the physical parameters of a spring under production. An electronic coiler control means C controls formation of a spring under production such that monitored parameters are maintained in accordance with preselected parameters received from a parameter processor D. The parameters include data indicative of pitch, length, and diameter, each of which may be selectively varied along the length of the spring, and are generated according to selected spring characteristics or dimensions.

The workpiece W is formed or wound on a mandrel 10 to form a coil. The workpiece commonly includes a length of steel bar stock having appropriate physical characteristics as are known in the art for achieving the final desired spring parameters. The mandrel 10 is connected to a quill assembly 12 which allows the mandrel to turn about a longitudinal axis L, and also supplies support to the mandrel 10 in the vertical and horizontal direction. The quill assembly 12 is reciprocable in the horizontal direction by being slidably connected to a frame 14 by means of quill assembly guide rods 16. The quill assembly is connected through a self-aligning coupler 18 to a quill assembly retracting cylinder 20. The cylinder 20 is, in the preferred embodiment, fluid activated and electrically controllable. After a coil has been completely wound about the mandrel 10, the cylinder 20 is actuated to cause horizontal reciprocation of the quill assembly 12 and a corresponding horizontal reciprocation of the attached mandrel 10.

With continuing reference to FIG. 1, a roller and stripper assembly 22 attached to frame 14 and a bed 24, engages the workpiece W after the spring coil has been completed. The reciprocation strips the coil from the mandrel when the mandrel 10 is reciprocated by activating the cylinder 20 by an appropriate electrical signal. The roller and stripper assembly 22 engages a completed coil, holding it stationary while the mandrel 10 is reciprocated away from a chuck 30 at a break point 26 allowing the completed coil to be removed from the coiler A, as is known in the art. The quill assembly 12 also gives sufficient support to the mandrel so that it may maintain its vertical stability if removed from the chuck 30, opposite the quill assembly.

The chuck 30 is aligned with the mandrel, on a side opposite of the quill assembly 12. The chuck 30 grips the leading end of the workpiece to be formed about the rotating mandrel 10. Several embodiments of suitable chucks are well-known in the prior art, however, a new chuck assembly whose function will become better appreciated as the machine is fully disclosed as discussed herein below. A spindle 32 is selectively attached to the chuck 30 such that any one of a plurality of chucks may be mounted as necessitated by preselected characteristics of the workpiece used or the desired coil. The spindle is rotated by a drive motor 34, acting through a clutch 36. An electrically controlled fluid brake 38, as is well-known in the prior art, selectively halts and permits rotation of the mandrel. In this manner, the clutch 36 and the brake 38 are selectively engaged and disengaged by imposition of appropriate electrical signals.

With particular reference to FIG. 2, a pull rod 40 is mounted concentric to the spindle 32. The pull rod 40 is reciprocable along its longitudinal axis, which corresponds to the longitudinal axis L of the spindle 32. Reciprocation is, in the preferred embodiment, accomplished through use of a fluid controlled cylinder, the end of which is denoted by 42 (FIG. 1). The fluid controlled cylinder is controllable electrically, as noted above. The end of the pull rod 40 is squared adjacent a mandrel end 44 to receive a roller pin 46 and a front chuck roller 48. Adjacent to the front chuck roller 48 is a similar rear chuck roller 50 attached also to the squared end 44 of the pull rod 40 by a roller pin 52. An adapter 54 is attached to spindle 32 by fastener 56. The adapter 54 allows for placement of a chuck housing 58 adjacent the spindle 32. A dog 60 is mounted within the chuck housing 58 by a chuck lever pin 62. A face plate 64 is attached to the chuck housing 58 by fastener 66. The front chuck roller 48 is adapted to engage the dog 60 causing it to pivot about the lever pin 62 as the pull rod 40 is reciprocated. The rear chuck roller 50 engages the face plate 64 to cause a corresponding and opposite force on pull rod 40 as the front chuck roller pin 48 causes displacement of the dog 60. When the dog 60 has been caused to pivot upon chuck lever pin 62, a workpiece W may be cammed between the dog and the mandrel 10.

In the chuck design of FIG. 2, the mandrel has a channel 68 extending spirally from the centerline L of mandrel. The dog 60, when engaging the workpiece W, is recessed to a point substantially flush with the face of the mandrel 10. The spiral channel allows a coil to be formed which has a correspondingly spiralled pigtail, i.e. a widening diameter, on the leading edge of the coil. The spiral channel and the flush position of the dog allows appropriate workpiece guide members to be placed close to the end of the coil being formed. In this manner, easy formation of coils, not previously possible under the prior art, is facilitated.

With reference again to FIG. 1, the angular position and velocity of the mandrel are monitored by a mandrel angular position monitoring means or transducer 70. In the preferred embodiment, the mandrel angular position monitoring means includes a chopper wheel 72, which defines teeth around the periphery thereof, is mounted to the mandrel for rotation therewith. The chopper wheel teeth break a light beam path in an opto-isolator 74 generating countable digital pulses, which pulses are indicative of the rotational position and velocity of the spindle 32, the chuck 30, and the mandrel 10. A spindle rotation resolver 76 is connected with the chopper wheel to align the rotational mandrel 10 to a preselected angular orientation.

Figure 4:
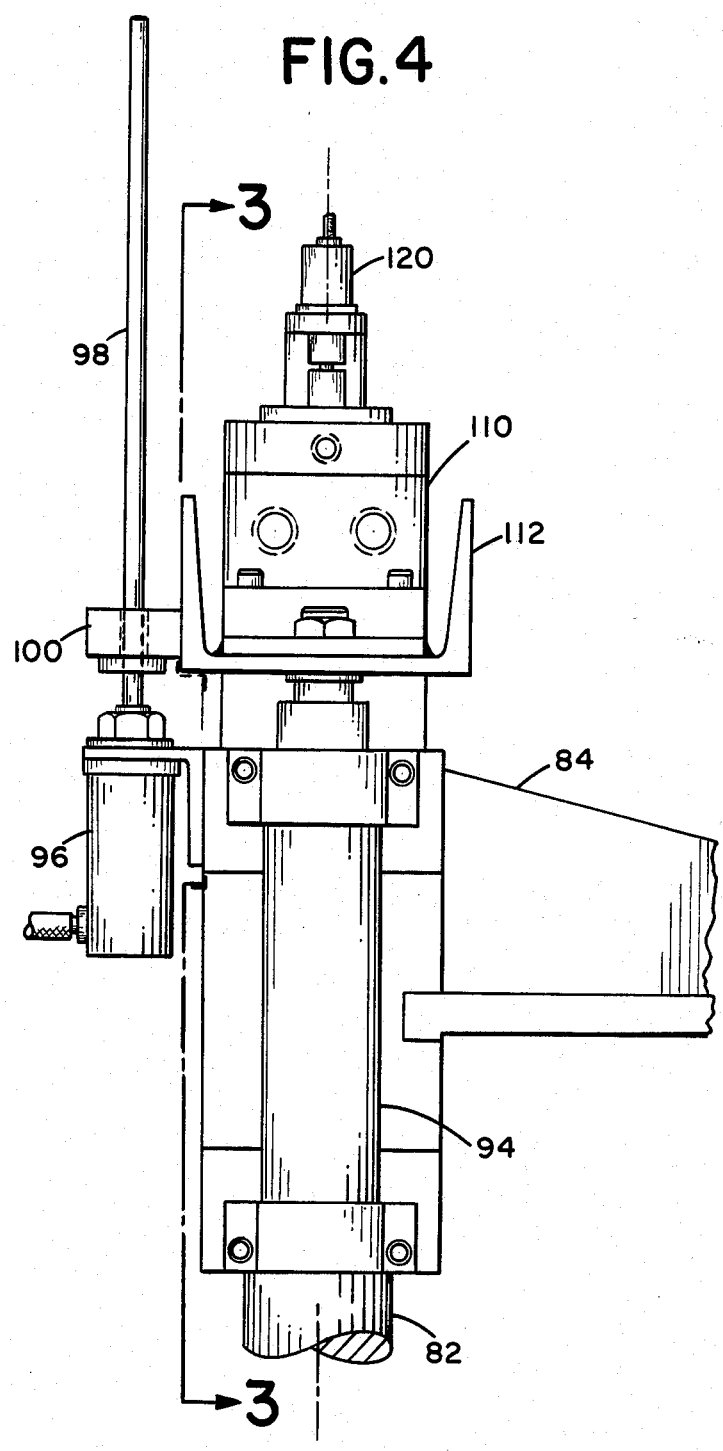
FIG. 4 is an elevational view taken along line 4—4 of FIG. 3.

With continuing reference to FIG. 1 and particular reference to FIGS. 3 and 4, a guide roller assembly E directs the workpiece W around the mandrel 10 during the coil forming process. As the workpiece W is coiled about the mandrel 10, a circumferentially channelled guide roller 80 directs the workpiece about the mandrel. The guide roller assembly E affords the guide roller 80 three degrees or axes of freedom. The guide roller assembly E reciprocates the roller along the longitudinal axis L of the mandrel 10 (axis 1), along a radial axis J perpendicular to the longitudinal axis of the mandrel 10 (axis 2), and angularly around the radial axis J (axis 3). In this manner, the guide roller 80 is varied in position along, spacing from, and a pitch with regard to the longitudinal axis L. In the preferred embodiment, all of these movements are electrically controlled through fluid actuators. The position of the guide roller is monitored by an array of transducers which generate electrical data signals defining the position of the guide roller 80 at all times.

A support shaft 82 is connected to a carriage or follower member 84 which is mounted for reciprocation along a coiler assembly guide rod 86. The follower member 84 is reciprocated parallel to a longitudinal axis K of the guide rod 86 by a first or axis 1 reciprocating means, such as by a electrically controlled, fluid activated carriage thrust cylinder 88 (FIG. 1). Reciprocation of carriage member 84, and the roller support shaft 82, and guide roller 80 parallel to the longitudinal axis L of mandrel 10 is controlled by a fluid control solenoid 90 or the like in response to appropriate electrical signals.

The relative position of the carriage 84 is sensed by a first or axis 1 transducer, such as a the digital linear displacement transducer 92, which generates a signal indicative of the longitudinal position of the guide roller assembly E along the mandrel axis L. The axis 1 transducer may include a linear graticule which moves through a light beam as the roller assembly moves. A photoelectric transducer may index an up/down counter with output pulses caused by the graticule breaking of the light beam such that the counter state indicates longitudinal position.

A second or axis 2 reciprocating means, such as a plurality of electrically controlled fluid cylinders 94, is connected between the carriage 84 and the roller support shaft 82 to control placement of the roller along the longitudinal axis of the support shaft, i.e. the radial axis J. In response to appropriate electrical signals, the axis control cylinders 94 are extended and contracted displacing the roller 80 in the vertical direction. A second or axis 2 transducer 96 (FIG. 4) monitors displacement of the roller from the longitudinal axis L of the mandrel by monitoring longitudinal displacement of the support shaft 82. The axis 2 transducer 96 generates a pulse train or other electrical signal indicative of the vertical displacement of the support shaft 82. In the illustrated embodiment, the axis 2 transducer includes a position indicative rod 98 which slides in a relatively displacement referencing bushing 100. Alternately, the rod 98 may be connected with a graticule which breaks the light beam associated with a photoelectric transducer.

An angular orientation or axis 3 control means, such as a motor 110, is connected with the support shaft 82 to rotate the support shaft about its longitudinal axis J. The angular orientation motor 110, in the preferred embodiment, is a fluid driven and electrically controlled motor. The angular orientation motor 110 interconnects the support shaft 82 with a base 112 that is mounted on the carriage 84. The base 112 is connected with the radial adjustment cylinders 94 between the base 112 and the support shaft 82. A thrust bearing 114 is disposed to give added support to support shaft 82 along the radial axis. J. The stator of the motor 110 is connected to the base 112 and the motor rotor is connected to the support shaft 82. When the axis 3 motor 110 is activated, the roller support shaft 82 rotates about the radial axis J, transmitting a corresponding motion to the guide roller 80 attached thereto.

An axis 3 or third transducer 120 for determining the relative angular displacement of the roller support shaft 82 about the radial axis J is attached to the top of the roller support shaft. The axis 3 transducer 120 generates an electrical signal corresponding to the relative angular position of the guide roller 80 about the radial axis J.

In this manner, all stages of the coil forming process are electrically controllable. The mandrel motor 34 controls rotation of the mandrel 10; the longitudinal position or axis 1 cylinder 88 controls the longitudinal position of the roller 80; the radial position or axis 2 cylinders 94 control the displacement of the roller radially relatively to the longitudinal axis L; the angular orientation or axis 3 motor 110 controls the angular orientation of the roller relative to the longitudinal axis L. During coil formation, electrical signals are generated which are indicative of the coil dimensions. The mandrel angular position transducer 70 monitors rotational position of the mandrel; the longitudinal carriage position or axis 1 transducer 92 monitors the position of the roller 80 along the longitudinal axis L; the radial displacement or axis 2 transducer 98 monitors radial displacement of the roller from the longitudinal axis; the angular position or axis 3 transducer 120 monitors the angular position of the roller relative to the longitudinal axis. The coiler A is particularly suited to control through electrical logic manipulation, particularly with a digital computer.

Figure 6:
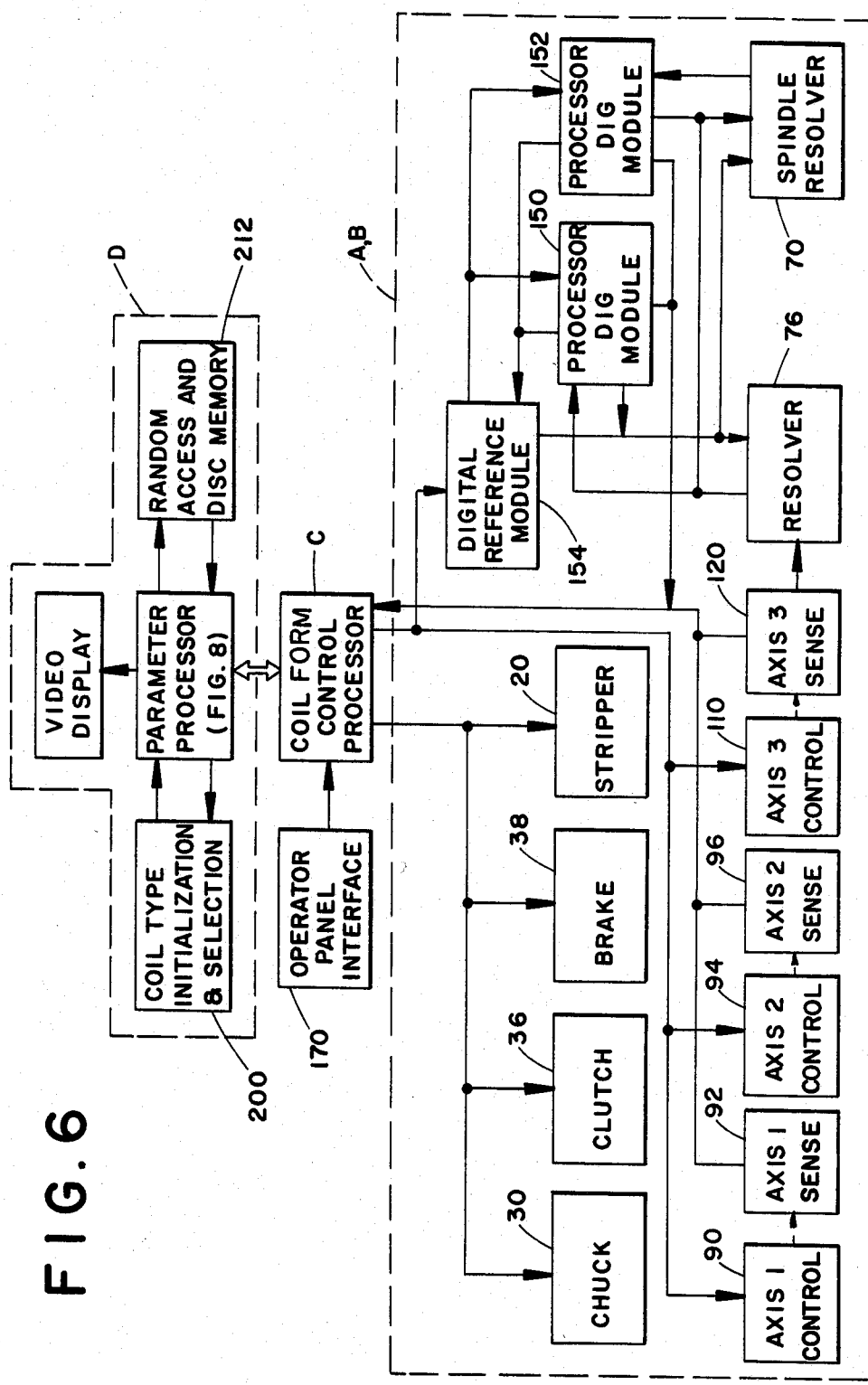
FIG. 6 is a flowchart demonstrating the digital control of the coiling apparatus of FIG. 1.

With reference to FIG. 6, the sense transducers and controllers of the coiler A have been reduced to blocks. The axis data acquisition circuit or means B includes processor digital modules 150 and 152, and digital reference module 154. The processor digital modules 150, 152 translate the mandrel rotation orientation signal from the mandrel angular position transducer 70 into discrete logic representations.

The coiler A is controllable with electrical signals from a coil form control processor C. The control processor C is loaded with appropriate data to allow for the monitor and control of the coiler A to achieve a coil with preselected coil characteristics or dimensions. This loaded data, referred to as coiling parameters, is generated by the parameter processor D.

Figure 7:
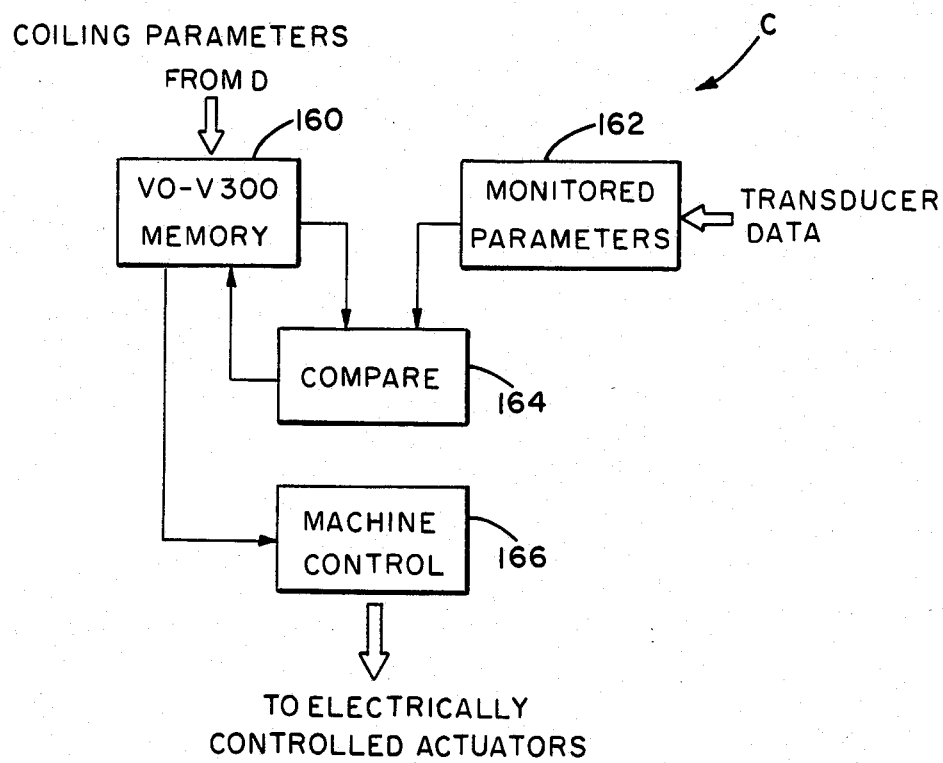
FIG. 7 is a flowchart demonstrating the operation of the control C of FIG. 6; and, FIG. 8 is a flowchart of an initialization routine for setting spring parameters.

Referring now to FIG. 7 with continued reference to FIG. 6, the coiling parameters are received from the parameter processor D, into memory 160, which includes a plurality of random access memory registers or variables V0-V300. Selected variables in the group V0-V300, as is more evident by Table 1 below, act through a machine control circuit or means 166, to control the coiler A, based upon their numeric contents. Selected registers of the memory 160 are compared to the transducer data in a continually updated, temporary memory 162 in a comparing circuit or means 164. The comparing means 164 recognizes the present status of a coil being formed, as well as the desired coiling parameters dictated by the preselected coil dimensions, and generates revised coiling parameters therefrom. The machine control 66 monitors the changes in the values of variables V0-300 and implements corresponding changes in the appropriate control signals for the coiler A. In response to a deviation between the coiling parameters and monitored parameters, a machine control 166 thereby generates the appropriate control signal for the axis 1 cylinders, the axis 2 cylinders, and the axis 3 motor. The machine control further generates the appropriate signals to control the chuck motor 34, the clutch 36, the mandrel dog 60, the mandrel brake 38, the stripper cylinders 18, and the like at appropriate times during the coil winding cycle. The machine control signals are related to the coiling parameter differences by variables which are determined as a function of coiler A dimensions, speed of moving parts, type of linear and angular position controls, and other properties of the specific coiler utilized. A variable member 168 stores selected variables to be used in the conversion functions. Changing the conversion function variables not only enables different coilers to be used, but also changes the structure of the resultant coils.

Specific to the preferred embodiment, when the coil forming process is initialized, the coiler control processor C generates data to cause: (1) the mandrel 10 to move to a preselected angle about its longitudinal axis L, (2) the guide roller 80 to be positioned at a preselected angle to the longitudinal axis, (3) the guide roller 80 to be placed at a preselected distance from the longitudinal axis L, and (4) the guide roller assembly E is placed at a preselected position along the longitudinal axis L. The workpiece W is loaded between the chuck 30 and the dog 60, and rotation of the mandrel 10 is commenced. The workpiece W is guided by the guide assembly E. As the coil forming process continues, the data acquisition unit B monitors the current actual coil dimensions. The data acquisition unit is scanned at a rate of approximately 4 milliseconds. When the coiler control processor C determines that the guide roller assembly has progressed to a point along mandrel 10 at which a change in the coil control instructions is required to achieve the preselected coiling parameters, an appropriate signal is sent to the appropriate one or ones of the axis 1, axis 2, and axis 3 control means to vary the corresponding axis and the coil characteristics, accordingly.

The rapid scan rate of information generated by the axis 1 transducer 92, the axis 2 transducer 96 and the axis 3 transducer 120 coupled with the ability to independently alter the three axes, allow for a virtually infinite variety of spring forms. Pitches may be varied constantly over the length of the coil, without the necessity of discrete pitch segments. When a mandrel of varying diameter is utilized, springs of varying diameters are obtained. With this ability, springs with desired end characteristics, including compressed ends and pigtails, can be formed.

In addition, an operator panel interface 170 is interfaces in coiler control processor C to allow for the automatic control of the coil forming process to be circumvented at any time by a human operator. At this point, the operator can alter, delete, or amend coiling parameters already in the coiler control processor C. In addition, the coiler control processor has control over the chuck 30 to control grasping of the workpiece from which a coil is to be formed by the dog 60 prior to winding about the mandrel 10 and released after completion of the finished coil.

The clutch assembly 36 is similarly controlled from the coiler control processor C wherefrom the drive motor 34 is selectively engaged and disengaged from the mandrel 10. The brake 38 is also controlled by the coiler control processor C to allow for the mandrel 10 to be stopped after the clutch 36 has been disengaged. The stripper 22 engages a completed coil when the mandrel 10 is reciprocated, when the coiler control processor C generates an appropriate signal to the cylinders 18.

The preferred operation of the parameter processor D is depicted in the flowchart of FIG. 8. The parameter processor D is a microcomputer system with an associated permanent memory storage device in which selected coiling parameters are stored for recall. In the preferred embodiment, the parameter processor microcomputer includes a cathode ray tube, disc storage device, a central processor unit, and random access memory. The parameter processor microcomputer is in data communication with the coiler control processor C through a suitable interface. The parameter processor functions to receive data indicating the preselected dimensions of a desired coil, and convert them into the coiling parameters required by the control processor C. The computer program includes an initializing step or means 200 at which the various functions of parameter processor D are selected by the operator.

The program of FIG. 8 is geared to a user-friendly data entry wherein the parameter processor D requrests all information required in a logical progression of interrogative steps. It is not necessary that the parameter processor D be in data communication with the coiler control processor C for all functions of the parameter selection routine. For actual production to be commenced, the coiler control processor C is loaded with appropriate coiling parameter data.

First, the program requests that the operator select one of five functions which the parameter processor D performs. The functions include: (1) entering the parameters defining a new coil (200a), (2) checking dimension of a previously defined coil and loading the coiler control processor C with the necessary data to obtain a product with these dimensions (200b), (3) listing the parameters of all coils presently stored in memory (200c), (4) deleting spring data from memory that has been previously defined (200d), and (5) communication between the coiler A and the parameter processor D (200e).

Should the user select the first option, entering data defining a new coil, the parameter processor proceeds to a step or means 202 which generates a display which requests identification of the spring, such as a part number and a spring type. Spring types, as defined by the program, are placed, in the preferred embodiment, into five categories:

Type 1 equals closed ends, tapered.
  This is a standard type of industrial spring. Calculations are based on the bar being tapered to a point which is one-quarter of the bar thickness before the spring is coiled. This will produce a flat end of 270° when the spring is coiled.
Type 2 equals closed ends, blunt bar.
  This is a coiling procedure used by some manufacturers. The spring is coiled with both ends closed, but the bar is not tapered for coiling. The resulting spring is similar to that manufactured as type 1 but the ends of the springs must be ground after coiling to obtain 270° flat ends.

Type 3 equals closed, tapered—open.

This is a spring design which has been much used in the automobile industry in the front of vehicles. One end is tapered before coiling as is described under type 1. The other end is not tapered and the spring is coiled with the last coil, the bunt end of the bar, remaining opening at a prescribed pitch to fit a special spring seat. Approximately the last one inch to one and one-quarter inches of the bar is usually left straight, not coiled. This is called a tangent tail because it protrudes outside of the spring diameter tangentially.

Type 4 equals open—open, tangent tail.

The type 4 spring is coiled from a plain blunt bar. Both ends remain open with both end coils coiled to suit special spring seats. Each end has a tangent tail as described under type 3.

The "Type 4" spring type is used for entering all springs which do not specifically fit into types 1 through 3. It provides a general dimension system which will suit all types of springs if the correct dimensions are entered (see FIG. 5).

Type 5 equals pigtails—open or conical.

A pigtailed spring is one in which one end coil or both end coils are reduced to a lesser diameter than the body of the spring. Only one pigtailed end coil can be formed in the coiler. If both ends require reduced diameters, the second end is coiled at the body diameter in appropriate pitch, and the diameter is reduced by the second operation in a separate machine before the spring is substantially quenched.

After the data at step 202 has been entered, the program proceeds to a means or step 204 for displaying a spring selection graphical. FIG. 5 depicts spring graphics as generated on the computer CRT with the general coil dimensions being represented by variables. At data request means or step 206, the program requests values for the displayed variables. The operator defines the diameter of the workpiece being coiled denoted by bar ("BAR"), the inner diameter of the completed coil ID, the total length of the spring L (hot length), and one of several possible length segments (L1, L2, L3, L4, LE and pitches P1, P2, P3, P4, PE throughout the spring. Various length variables permit selection of the distance or length of each selected pitch. The operator entered data is entered by data entry step or means 206 of FIG. 7.

Once the data has been acquired to form the desired coil type, a parameter storage step or means 210 stores the acquired parameters in a memory storage 212 for future retrieval. The same coil can be produced at a later time by addressing the spring parameter memory 212 with the part number to cause the stored coil parameters to be retrieved. An inquiry step or means 214 inquires whether the coiler A should be loaded with the entered data. If the operator responds in the negative, another function may be entered or the program may be terminated by a termination step or means 216, 218. If the operator enters that the coiler should be loaded, the coiling parameters of the selected spring are calculated and loaded.

The coiling parameters with which the coiler A operates are noted in TABLE 1 below, as referred to as a range of registers between V(ariable)0 through V330. Those items in Table 1 preceded by an asterisk (*) denote those registers which are altered to produce a coil of the desired characteristics. A calculation step or means 220 calculates appropriate machine control values to cause the selected coiler A to form a coil with the selected parameters appropriate values stored in the register for formation of the desired spring as denoted in Table 1. Alternately, the calculations may be accomplished by a look-up table wherein necessary operating parameters have been precalculated for each spring characteristic. The values of the look-up table may be arrived at from precalculation, or experimentation to achieve optimal results.

When the coiling parameters necessary to control the coiler A to form a spring with preselected coil dimensions have been calculated by step or means 220, communication is established with the coiler control processor C (FIG. 1) by coiler control processor load step or means 222. The coiling parameters having then been loaded into the coiler control processor C, the operator may then terminate the program at step or means 216, 218 or may proceed to request another function.

If at step or means 200b the operator selects the second options, checking a dimension of a previously loaded spring or loading the coiler control processor C with the stored coiling dimensions, a step or means 230 requests that the operator identify a previously stored coil, such as by part number. After the stored coil is selected, a stored coil display means or step 232 generates the FIG. 5 display with the length and pitch variables replaced by the corresponding stored coil dimensions. The operator may then alter any dimensions at storage means 234, calculate the appropriate coiling parameters, then load the coiler control processor C at steps or means 214, 222 as previously described. The operator may then terminate the program at steps or means 216, 218, or request another function with step or means 200.

If the operator chooses the third option, listing all springs stored in coil parameter memory 212, a display generating step or means 240 displays an index of all stored part numbers and the corresponding spring parameters for each. For example, FIG. 5 style displays for each spring may be serially displayed. The serial display of available springs may be stopped and the displayed coil parameters loaded into coiler control processor C by the steps or means 214, 220, and 222. The routine can be terminated or another function can be selected.

If the operator selects the fourth option at a step or means 200d, selected coiling parameters presently stored in the coiling parameter memory 212 are retrieved in a parameter retrieval step or means 250 and deleted from the memory. Thereafter, the operator has the option of requesting another function or terminating the program.

If the operator chooses the fifth option at step or means 200e, the operator is accorded access to communicate with the coiler control processor C at step or means 222. Direct access provides the operator with the ability to alter, delete, and add previously loaded coiling parameters in the coiler control processor C. The coiler control processor C includes the machine control means 166 which operates on the coiling parameters to generate appropriate control signals for the coiler A. Specifically, the machine control means operates on the coiling parameters with machine variables which indicate the functional relationship between coiling parameters and coiler operations and movement. With access to the coiler control processor C, the operator can specify or alter the values specified for each of these variables. Some of these variables are used only for certain calculations aids. All the important variables are described in Table 1. Those which are preceded with an asterisk (*) are those which contain information to produce the springs. Those without an asterisk are auxiliary variables and they are inaccessible from the parameter processor D during execution of the communication step or means 200e.

TABLE 1

| | |
|---|---|
| V0 | Address for V1 transferred from foreground to background. |
| V1 | Spindle position. V1 contains the angular position of the spindle 32 and is used internally for calculating the pitch of the coil. |
| V2 | Spindle Delta. V2 is the change in V1 for each 4 millisecond scan. This is used to control the coil pitch. |
| *V3 | Initial guide angle (Axis 3) This is the angle required for loading the workpiece W to the starting position of the chuck 30. The angles of the guide required for each pitch are calculated from this position. |
| *V4 | Initial guide height (Axis 2) V4 provides the vertical position of the guide for loading the coil bar on top of the mandrel 10 under the clamping dog 60 for a given diameter of roller. The computer program calculates the position necessary to allow the workpiece W to be loaded horizontally, lying on top of the mandrel 10 and under the guide roller 80 in the groove of the roller. If a position above or below the calculated position is desired, V4 can be changed by Function 5, KEYBOARD COMMUNICATION, following these steps: 1. Call Function 5. (Processor C must be in "RECEIVE DATA" mode.) 2. Type V4 = ? 3. Note dimension of V4 residing in coiler. 4. Calculate desired alteration of V4. |
| *V5 | Total number of pitches in the coil (active pitches, plus 2). |
| *V6 | Time delay to clamp the workpiece before the clutch is engaged. |
| *V7 | Type of coil: 1=closed, tapered ends, etc. |
| *V8 | Provides time for extra mandrel revolutions to knock down the tail of the coil, or to allow coiling of a zero pitch coil at the end thereof. |
| *V9 | The radial angle of zero pitch coil (flat coil) at the start thereof. For Types 1, 2, 3, and most type 4 coils V9 must be "0". |
| V10 | The pitch scale factor calculated by the machine computer. |
| *V11-V17 | Pitch dimensions. These variables provide the seven pitches available. |
| V20-V39 | Axis #1 (see FIG. 5) variables used in the servo routine. None are available or required for keyboard access. |
| V40-V59 | Axis #2 variables used in the servo routine. V42 is available for keyboard alteration. |
| *V42 | Feedrate of vertical motion of the guide roller 80. |
| V60-V79 | Axis #3 variables used in the servo routine. These are not available for keyboard access or manual use. |
| V80 | Rate of change of guide angle for blending between pitches. |
| V82-V90 | Guide angles for pitches 2-7. (Guide angle for pitch #1 is V3.) See description under V3. |

TABLE 1-continued

| | |
|---|---|
| *V91-V95 | These variables supply dimension for raising the guide to suit pigtailed or conical coils. V4 provides the original position from which subsequent radii are measured. V91-V95 are positions above V4. |
| V99 | Variable used to transfer information from coiler back to the host computer. |
| *V100 | Initial position for Axis #1. This is calculated by the host computer but may be modified by Function 5, KEYBOARD COMMUNICATION. |
| *V101-V106 | These variables express the positions at which one pitch ends and another begins. V101 indicates the end of pitch #1 and the beginning of pitch #2. |
| *V109 | This variable indicates the end of coil, i.e., the final position of the guide centerline. |
| V112-V119 | Variables for the first Vari-Pitch routine. |
| *V112 | Rate of guide angle change per scan, or scans per unit change. |
| *V113 | Number of scans at V112 variation before changing variation to V112 + 1. This is to correct or balance any required fractional variation while retaining whole digit values in the variables. |
| *V114 | Indicates increasing or decreasing pitch in Vari-Pitch routine. +1 = increasing pitch −1 = decreasing pitch |
| *V115 | Beginning pitch increment in first Vari-Pitch routine. |
| *V116 | Change in pitch per scan. |
| *V117 | Number of scans at V116 variation before changing variation to V116 + 1. This is to correct or balance any required fractional variation while retaining whole digit values in the variables. |
| *V118 | Beginning angle of roller 80. |
| *V119 | Indicates selection of angle change per scan, or scans per angle change, depending on magnitude of Vari-Pitch change. 1 = scans per unit angle change. 0 = angle units changed per scan. |
| *V120 | Delta for returning Axis #1. The value of V120 is the feedrate for returning the carriage from V109 to V100. |
| *V123 | Delta for returning Axis #3. The value of V123 is the feedrate for returning the guide angle from the last used angle to V3. |
| *V124 | Vertical height for returning the guide 42. For pigtailed and conical coils V124 should be sufficiently greater than V91-V95 to clear the coil. |
| V125-V129, V132-V134 | Variables for the second Vari-Pitch routine. |
| *V125 | Beginning pitch increment in second Vari-Pitch routine. |
| *V126 | Change in pitch per scan. |
| *V127 | Number of scans at V126 variation before changing variation to V126 + 1. This is to correct or balance any required fractional variation while retaining whole digit values in the variables. |
| *V128 | Beginning guide angle. |
| *V129 | Indicates selection of angle change per scan, or scans per angle change, depending on magnitude of Vari-Pitch change. 1 = scans per unit angle change. 0 = angle units changed per scan. |
| V130 | The rotational position of the mandrel 10 during coiling of the spring. V130 is used to measure the position for ending a zero pitch coil at the beginning of the spring. V130 is not available for keyboard communication. |
| V131 | Address for V130 transferred from foreground to background. |
| *V132 | Rate of guide angle change per scan, or scans per unit change. |

TABLE 1-continued

| | |
|---|---|
| *V133 | Number of scans at V132 variation before changing variation to V132 + 1. This is to correct or balance any required fractional variation while retaining whole digit values in the variables. |
| *V134 | Indicates increasing or decreasing pitch in Vari-Pitch routine.<br>+1 = increasing pitch<br>−1 = decreasing pitch |
| V135 | An auxiliary variable for operation of Axis 3 (not available for keyboard communication). |
| *V140 | Quantity of radii used for a conical or pigtailed coil. Selects variables V91-V95. |
| *V141-V145 | Feedrate for raising the guide to suit a conical or pigtailed coil. V141 = the feedrate between V4 and V91, V142 = the feedrate between V91 and V92, etc. |
| V150 | Counting auxiliary for one-shot. |
| *V151-V155 | Angular position, measured by V130, at which the change in radius command and feedrate command occurs. V151 indicates change from V4 to V91 at a feedrate of V141. V152 indicates change from V91 to V92 at a feedrate of V142, etc. |
| V160-V169, V202-V209, | Counting and one-shot auxiliaries. |
| V195 | An auxiliary variable for operation of Axis 2 (not available for keyboard communication). |
| V200, V201 | Addresses for error messages from E120. |
| V216 | Auxiliary for V116. |
| V226 | Auxlliary for V126. |
| V267 | Auxiliary for V60 and V67. |
| V300 | Address for variables transferred through C119. |
| V330 | Auxiliary for V130 for comparison to V9. |

A typical coil making operation might progress as follows:

An operator initializes a digital computer system D which includes the initialization routine of FIG. 8. The basic coil which the operator wishes to place into production is already on disc memory. Option 2 (200b) is then selected at 200, and in response to a prompt, the operator identifies at 230 his stored coil data. A representation, as in FIG. 5, of a coil is then displayed with its associated dimensions, including inner diameter, workpiece width, total coil length, and number and length of active pitches. Assuming that two active pitches are displayed and the operator wishes to change the number to three, he may do so at step or means 234.

The operator now chooses to load at step or means 214, at which time the parameter processor D calculates the coiling parameters V0-V300 and sends them to the coiler control processor C.

The coiler control processor C assumes control over the coiler A, positions the mandrel 10 in its start position, and a workpiece is clamped to the mandrel by dog 60. The mandrel 10 commences rotation, and the workpiece is guided thereabout by guide roller 80, according to the coiling parameters, to form a coil with the selected dimensions.

After the coil has been completely formed, the workpiece is released from the dog 60 and the mandrel 10 is reciprocated releasing the completed coil which is held stationary by stripper 22. In this way, a coil has been formed according to preselected characteristics with a minimum amount of operator interaction.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described my invention, I claim:

1. A coil forming machine comprising:
    a means for storage of data indicative of preselected coil characteristics;
    a means for forming coils, the coil forming means selectively varies formation of the coils according to at least one of the preselected characteristics;
    a means for sensing at least one of the preselected characteristics as a coil is formed and generating signals indicative thereof, said sensing means being operatively connected to the coil forming means;
    a means for comparing the signals generated by the sensing means with the data indicative of preselected characteristics and varying the formation of the coil in accordance with the comparison to obtain a coil with at least one of the preselected characteristics.

2. The coil forming machine of claim 1, wherein the means for varying the formation of the coil includes a mandrel around which bar stock is wrapped to form a coil and a circumferentially channelled roller for adjustably directing bar stock to the mandrel to selectively vary formation of the coils according to the at least one preselected characteristic.

3. The coil forming machine of claim 2, wherein the mandrel has a longitudinal axis and the circumferentially channelled roller is reciprocable along the longitudinal axis and angularly retractable along an axis perpendicular to the longitudinal axis to selectively vary formation of the coils according to the at least one preselected characteristic.

4. The coil forming machine of claim 1, wherein the comparing means includes a microprocessor based digital computer.

5. The coil forming machine of claim 1, further comprising:
    a means for receiving data defining coil dimensions, a means for converting the data defining coil dimensions to the data indicative of preselected coil characteristics the data converting means being operatively connected with the data storage means to provide the coil parameter data thereto.

6. The coil forming machine of claim 5, wherein the receiving data means includes a microprocessor based digital computer.

7. A method of forming coiled objects, comprising the steps of:
    storing electronically, data representing selected coil parameters, said selected coil parameters including data indicative of at least one of length, pitch, and diameter of a completed coil;
    forming a coil;
    monitoring at least one of the parameters during the coil forming step;
    generating signals indicative of at least one of the monitored parameters;
    comparing the signals indicative of the monitored parameters to the selected coil parameters and generating comparison data therefrom;
    during the coil forming step, altering the forming of the coil according to the comparison data to form a coil of the selected parameters.

8. The method of claim 7 further including the step of:

initializing a coil forming machine to start parameters, prior to the step of forming a coil.

9. The method of claim 8 further including prior to the step of electronically storing data representing selected coil parameters, the steps of:
obtaining data indicative of selected coil dimensions;
converting the data indicative of the selected coil dimensions to data representing the selected coil parameters.

10. The method of claim 9 further including prior to the step of comparing the data indicative of the monitored parameters to the data representing the selected coil parameters, the step of:
transmitting the coiling parameter data to a data comparison device;
transmitting the generated signal indicative of at least one of the monitored parameters to the data comparison device.

11. An apparatus for forming coils comprising:
(a) an electromechanical spring coiler including:
  (i) a mandrel having a longitudinal axis,
  (ii) a means for rotating the mandrel about the longitudinal axis,
  (iii) a pivotal dog for selectively clamping bar stock to the mandrel;
(b) a guide assembly including:
  (i) a circumferentially channelled roller for directing the bar stock to the roller,
  (ii) first reciprocating means for moving the roller parallel to the mandrel longitudinal axis,
  (iii) second reciprocating means for moving the roller radially toward and away from the mandrel longitudinal axis along a radial axis,
  (iv) a pitch control means for rotating the roller about the radial axis, the first reciprocating means, the second reciprocating means, and the pitch control means being operatively connected with the roller;
(c) a data acquisition assembly including:
  (i) a first transducer for monitoring longitudinal positions of the roller along the longitudinal axis and generating longitudinal position signals indicative thereof,
  (ii) a second transducer for monitoring positions of the roller along the radial axis and generating radial position signals indicative thereof,
  (iii) a third transducer for monitoring angular positions of the roller around the radial axis and generating pitch signals indicative thereof;
(d) a coil parameter processor for providing coiling parameters indicative of at least operator selected pitch and diameter dimensions at a plurality of points along the length of a selected coil, the coil parameter processor including:
  (i) coil dimension entry means for entering operator selected coil dimensions,
  (ii) a coil dimension memory for storing the entered coil dimensions,
  (iii) calculation means for converting the coil dimensions to coiling parameters which represent the coil dimensions in transducer compatible units;
(e) a comparing means for comparing the longitudinal position signals, the radial position signals, and the pitch signals with the coil parameter signals, the comparing means being operatively connected with the first reciprocating means, the second reciprocating means, the pitch control means, the first transducer, the second transducer, and the third transducer and the calculation means; and,
(f) a means for controlling the first reciprocating means, the second reciprocating means and the pitch control means to maintain the compared signals in conformity, the control means being operatively connected with the comparing means.

12. A coil forming machine control apparatus comprising:
a first digital computer;
a video display operatively connected to the first computer;
a means for accepting coil data representing selected coil dimensions into the first computer, said coil dimensions including data indicative of at least one of length, pitch, and diameter of a preselected coil;
the first computer including a means for converting the coil dimension data into coil parameter data;
a means for monitoring parameters of a coil being formed and transmitting monitored parameter signals indicative thereof;
a second digital computer, operatively connected to the first digital computer to receive the coil parameters therefrom and operatively connected to the monitoring means to receive monitored parameters signals therefrom, the second computer including,
  a means for comparing the monitored parameter signals to the coiling parameters,
  a means for generating coiler control signals which coiler control signals vary in accordance with the comparison of the monitored parameter signals to the coiling parameters, and
  a means for transmitting the coiler control signals from the second computer; and
a means for controlling a coil forming machine in conjunction with the coil control signals.

13. The coil forming machine control apparatus of claim 12, further comprising:
a means for storing the coiling parameters for a plurality of preselected coils, the coiling parameter storing means being operatively connected with the second computer for supplying coiling parameters thereto.

14. The coil forming machine control apparatus of claim 13, further comprising:
a means for altering the coiling parameters stored for a plurality of preselected coils, the altering means being operatively connected to the coiling parameter storing means for storing the coiling parameters stored therein.

15. The coil forming machine control apparatus of claim 14, wherein the altering means adds, deletes, and amends the stored coiling parameters.

16. The coil forming machine control apparatus of claim 15, wherein the coiling parameter storing means including a disk drive.

* * * * *